United States Patent
Karelse et al.

(10) Patent No.: US 10,654,539 B2
(45) Date of Patent: May 19, 2020

(54) CHILD BIKE SEAT

(71) Applicant: Thule Sweden AB, Hillerstorp (SE)

(72) Inventors: Joline Karelse, Utrecht (NL); Gert-Jan Van Breugel, Tuil (NL); Albert Nieuwenhuis, Geldermalsen (NL); Jort Nijhuis, Amsterdam (NL)

(73) Assignee: Thule Sweden AB, Hillerstorp (SE)

( * ) Notice: Subject to any disclaimer, the term of this patent is extended or adjusted under 35 U.S.C. 154(b) by 164 days.

(21) Appl. No.: 15/676,331

(22) Filed: Aug. 14, 2017

(65) Prior Publication Data

US 2018/0057088 A1 Mar. 1, 2018

(30) Foreign Application Priority Data

Aug. 30, 2016 (EP) ..................................... 16186363

(51) Int. Cl.
*B62J 1/16* (2006.01)
*B62J 1/18* (2006.01)
*A47D 1/10* (2006.01)

(52) U.S. Cl.
CPC ................. *B62J 1/16* (2013.01); *A47D 1/10* (2013.01); *B62J 1/18* (2013.01)

(58) Field of Classification Search
CPC ....................................... B62J 1/16; B62J 1/28
USPC .................................................... 297/452.12
See application file for complete search history.

(56) References Cited

U.S. PATENT DOCUMENTS

| | | | | |
|---|---|---|---|---|
| 3,596,986 A | * | 8/1971 | Ragsdale | A47D 1/008 297/183.6 |
| 3,934,934 A | * | 1/1976 | Farrell, Jr. | B60N 2/2806 297/467 |
| 4,053,091 A | * | 10/1977 | Martelet | B62J 1/16 224/415 |
| 4,592,592 A | | 6/1986 | Peek | |
| 4,750,783 A | * | 6/1988 | Irby | B60N 2/2848 297/130 |
| 5,299,818 A | * | 4/1994 | Newbold | B62J 1/16 224/415 |
| 5,370,441 A | * | 12/1994 | Chuang | B62J 1/02 224/415 |

(Continued)

FOREIGN PATENT DOCUMENTS

| | | |
|---|---|---|
| CN | 105163978 A | 12/2015 |
| CN | 204915785 U | 12/2015 |

(Continued)

OTHER PUBLICATIONS

European Search Report for European Application No. 16186363.4, European Patent Office, Munich, dated Jan. 9, 2017, 2 pages.

(Continued)

*Primary Examiner* — David R Dunn
*Assistant Examiner* — Tania Abraham
(74) *Attorney, Agent, or Firm* — Sterne, Kessler, Goldstein & Fox P.L.L.C.

(57) ABSTRACT

A bicycle child seat includes a seat body for accommodating a child therein and a fixation adapted to couple the bicycle child seat to a bike. The seat body includes a multi-layer structure with at least a first layer and a second layer made from different materials. The first layer is adapted to at least partially cover the second layer and to at least partially support the second layer.

21 Claims, 10 Drawing Sheets

(56) References Cited

U.S. PATENT DOCUMENTS

| | | | |
|---|---|---|---|
| 5,850,958 A * | 12/1998 | Belanger | B62J 1/02 224/415 |
| 6,305,744 B1 | 10/2001 | Martin | |
| 6,612,645 B1 * | 9/2003 | Hsu | B62B 7/12 280/650 |
| 6,652,034 B1 * | 11/2003 | Schramm | A47C 7/185 297/452.29 |
| 7,517,011 B2 * | 4/2009 | Aliev | A47D 13/025 224/161 |
| 7,523,986 B2 * | 4/2009 | Jefferson | B62J 1/16 297/195.13 |
| 7,673,934 B2 * | 3/2010 | Bearup | A47D 1/002 297/130 |
| 7,887,137 B2 * | 2/2011 | Fisher | A47C 3/00 297/440.2 |
| 7,909,400 B1 * | 3/2011 | Delaney | B60N 2/2821 297/250.1 |
| 8,251,388 B2 * | 8/2012 | Sauceda | B62J 1/16 224/415 |
| 8,640,935 B2 * | 2/2014 | Hagedoorn | B62J 1/16 224/415 |
| 8,851,569 B2 * | 10/2014 | Ho | A47D 13/025 297/250.1 |
| 2006/0267386 A1 * | 11/2006 | Nakhla | B29C 44/1271 297/250.1 |
| 2010/0013187 A1 * | 1/2010 | Oxley | B62J 1/16 280/402 |
| 2012/0180927 A1 * | 7/2012 | Jane Santamaria | A47D 13/025 156/60 |
| 2016/0075390 A1 * | 3/2016 | Blom | B62J 1/16 297/327 |
| 2016/0194043 A1 * | 7/2016 | Buttle | B62J 1/16 297/215.15 |

FOREIGN PATENT DOCUMENTS

| | | |
|---|---|---|
| DE | 9307485 U1 | 7/1993 |
| DE | 10147934 A1 | 4/2003 |
| GB | 2494246 A | 3/2013 |
| JP | 4912987 B2 | 4/2012 |
| NL | 1036383 C2 | 6/2010 |

OTHER PUBLICATIONS

European Office Action for European Application No. 16186363.4, European Patent Office, dated Feb. 13, 2017, 2 pages.
European Office Action for European Application No. 16186363.4, European Patent Office, dated Jul. 15, 2019, 2 pages.
Chinese Search Report and Office Action for Chinese Application No. 201710762838.8, Chinese Patent Office, dated Dec. 5, 2019, 19 pages.

* cited by examiner

CHILD BIKE SEAT

CROSS REFERENCE TO RELATED APPLICATION

This application claims foreign priority to EP Application No. 16186363.4, filed Aug. 30, 2016, which is hereby incorporated herein in its entirety by reference.

TECHNICAL FIELD

The technical field relates to a bicycle child seat.

BACKGROUND

Bicycle child seats, also referred to as child bike seats are known in the art and exist in different configurations for carrying the child behind or in front of a cyclist. Typically, such child bike seats are fixed on the bike by using adapters for clamping the child bike seat to components of the bike.

Known child bike seats comprise a seat portion, a footrest portion and an adapter or mechanism for fixing the child bike seat to the bike. The seat portion is adapted to accommodate the child and may comprise a seating portion, a back portion and two side walls. Typically, the seat portion is formed from a plastics material which is sufficiently rigid to support the child or from a relatively soft material with an interior steel frame. Such known child bike seats are, however, often uncomfortable for the child.

SUMMARY

Accordingly, it is desirable to at least address the foregoing and it is the object of the invention to provide an improved bicycle child seat.

In addition, other desirable features and characteristics will become apparent from the subsequent summary and detailed description, and the appended claims, taken in conjunction with the accompanying drawings and this background.

The object of the invention is solved by a child bike seat according to claim 1. Advantageous further formations are set out in the dependent claims.

Described in a first aspect of the present invention is a child bike seat comprising a seat body for accommodating a child therein, wherein the seat body comprises a multi-layer structure with at least a first layer and a second layer made from different materials.

Thus, the seat body may comprise two or more layers which form the seat body. The layers may be stacked upon each other with substantially no offset or may be stacked upon each other with an offset between the layers. In the context of the present invention, an offset of the layers is not to be understood to mean that the layers do not overlap each other. Rather, offset shall include a configuration in which a portion of one layer protrudes beyond another layer while another portion is overlapped with the one layer. For example, if two layers are provided, the configuration can be such that the second layer protrudes beyond the first layers so that a portion of the second layer is visible when viewing the first layer. Furthermore, the layers can be formed and arranged such that one of the layers, e.g. the second layer, at least partially surrounds an edge portion of the first layer. In other words, the second layer may comprise a recess in which an edge portion of the first layer can be accommodated.

The child bike seat further comprises a fixation means for coupling the bicycle child seat to a bike. The fixation means may be a mechanism which allows a fixation of the child bike seat on a rack of the bike. In particular, the mechanism may comprise a clamping mechanism for clamping the fixation means onto the bike rack.

The first layer is adapted to at least partially cover the second layer and to at least partially support the second layer. Hence, the first layer is adapted to at least partially receive a force from the second layer. For that, the first layer at least partially extends along the second layer.

According to an embodiment of the present invention, the first layer is adapted to at least partially support the second layer on said fixation means such that a movement of the first layer relative along the second layer is substantially prevented. Accordingly, the first layer may be arranged such that it receives a force from the first layer and transfers this force at least partially to the fixation means.

According to a further embodiment of the present invention, the first layer and the second layer are coupled to each other by a positive-fit connection. A positive-fit connection is generally achieved when two parts are engaged with each other such that the parts are not movable with respect to each other at least in one direction.

According to a further preferable embodiment of the present invention, the second layer comprises a uniform main surface facing the first layer. In the context of the present invention, uniform surface is to be understood as a surface which generally follows or is formed along a curved plane or curved surface. The uniform surface may be an area which is formed from curves which do not change their curvature. The uniform main surface comprises non-uniform surface areas. This means that the uniform surface comprises areas in which the above described uniformity is not present. Accordingly, there may be a local deviation in the uniform surface which does not render the uniform surface non-uniform in the meaning of the present disclosure. Such non-uniform surface areas may be openings or recesses, for instance. The first layer is adapted to said uniform main surface and said non-uniform surface areas. Accordingly, the first layer follows or extends along the second layer in the uniform area and the non-uniform areas. This does not necessarily mean the first layer fully covers the uniform and non-uniform areas. In the context of the present invention, adapted to the uniform and non-uniform areas shall only relate to the kind of extension of the first layer, namely that the first layer at least partially extends along the uniform and non-uniform areas. For example, if a hole is provided in the second layer, the first layer would at least protrude or extend into that hole to a certain extent.

According to a preferable embodiment of the present invention, at least one of the non-uniform surface areas of the second layer comprises a recess and the first layer comprises a protruding section, wherein the protruding section and the at least one recess are formed in a substantially mating manner. Hence, the protruding section is adapted to the shape of the recess and follows the outline of the recess. For example, the first layer may be formed such that it is in contact with a non-uniform surface area or is arranged with a predetermined distance, e.g. a constant distance from the portion of the second layer of the non-uniform surface area.

According to a further embodiment of the present invention, the first layer and the second layer are fixable to the fixation means by pressing the second layer towards the fixation means. In this configuration, the first layer may be arranged between the second layer and the fixation means.

Accordingly, both layers can be fixed to the fixation means by pressing the second layer towards the fixation means and, thus, against the first layer. In this way, the first layer is sandwiched between the second layer and the fixation means. The area on which a pressure may be exerted can be the seating area of the child seat.

According to a further embodiment of the present invention, the child bike seat further comprises a pressing member, preferably with an enlarged pressing surface, arranged on the second layer such that the second layer and the first layer are positioned between the pressing member and the fixation means. Accordingly, when the pressing member is pressed towards the fixation means, the first layer and the second layer are pressed against the fixation means. In this way, both layers can be securely held on the fixation means. The pressing member can be formed in a plate-like shape and can be a seat plate on which a cushion or soft portion may be fixed in order to render the bike seat more comfortable for a child. The pressing member can be configured such that an area of the pressing member covers as much as possible of an inside bottom of the second layer. In this way, the attachment strength can be increased and forces acting on the second layer can be spread. The pressing member can be formed from polypropylene and needs to be rigid enough to exert a substantially equally distributed pressing force on the second layer. Here, it is to be noted that the pressing member can be formed such as to be mating with the shape of the second layer against which it is pressed. It is desirable that the whole pressing member or at least a major portion of the pressing member contacts the second layer. Thus, if an area to be pressed on the second layer comprises a certain curvature, the pressing member will be curved in the same way. On the other hand, it is possible to use a flat pressing member and to form a flat portion in the second layer.

The pressing member can be adapted to engage with at least the second layer and to exert a pressing force towards the fixation means onto the second layer, wherein the pressing member preferably comprises protrusions protruding from a bottom side of the fixation plate towards the fixation means. The first layer can comprise projections protruding from the first layer in a direction facing away from said fixation means. The second layer preferably comprises recesses into which one of the protrusions and one of the projections respectively extend from opposite sides such that their end portions face each other, and wherein preferably the protrusions and projections comprise openings for accommodating a fixation device, preferably a bolt, for fixing the pressing member to the fixation means. Accordingly, the one or more protrusions formed in the second layer may be through holes into which one protrusion and one projection extend. The projections and protrusions may extend into the through holes such that they contact each other at their forward ends or may extend such that a space remains between the forward ends. If the material of the second layer is compressible, the distance between the forward ends corresponds to an amount to which the second layer can be compressed at maximum.

According to a further embodiment of the present invention, the bicycle child seat further comprises a covering member for covering the pressing member, the covering member being configured as a seating element of the bicycle child seat and is preferably made from a soft material, e.g. ethylene-vinyl acetate. The covering member may correspond to a relatively soft seat cushion.

According to a further embodiment of the present invention, the Young's modulus of the second layer is smaller than the Young's modulus of the first layer, wherein the second layer is preferably formed from a foam material and wherein the second layer is preferably solid. Accordingly, the second layer may be less rigid compared to the first layer. Furthermore, the second layer may be solid meaning that it does not have a hollow framework structure.

According to a further embodiment of the present invention, the first layer is formed from a thermoplastic material including but not limited to polypropylene, polycarbonate, acrylonitrile butadiene styrene and polymethyl methacrylate, and the second layer is formed by expanded polypropylene, wherein the second layer can comprise an internal reinforcement structure and/or an expanded polypropylene mixture containing a strengthening component. A strengthening component may be realized by means of fibers, i.e. fibers or other strengthening components may be added to the mixture. A reinforcement structure may be realized by e.g. elongated parallel wires or bands or a grid of metal, plastic or other material suitable for strengthening the second layer. A strengthened structure may be achieved by providing an injection molded space structure and overmolding the same with a second surface type material, e.g. with expanded polypropylene.

According to a further embodiment of the present invention, the expanded polypropylene comprises a density ranging from 40 to 120 gr./ltr., preferably from 50 to 100 gr./ltr., most preferably from 60 to 80 gr./ltr.

According to a further embodiment of the present invention, the first layer comprises a thickness of 1.6 to 2.9 mm, preferably a thickness from 1.7 to 2.0 mm, most preferably a thickness of 1.8 mm, and the second layer preferably comprises a thickness varying from 8 mm to 31 mm, preferably from 17 mm to 31 mm. For example, the backrest or back portion may vary from 17 mm in the seating portion to 31 mm at a lower area of a backrest portion to 23 mm at the upper edges of the backrest. Preferably, the functional thickness to give a rigid but lightweight seat could be 28 mm at the lower area of the backrest and can be gradually reduced to smaller thicknesses of 8 mm at the edges.

According to a further embodiment of the present invention, the first layer is structured as an outer seat shell and the second layer is structured as an inner seat shell accommodated in and provided adjacent said outer seat shell.

According to a further embodiment of the present invention, each layer is integrally formed, preferably by injection molding, and comprises side walls, a bottom portion and a back portion jointly forming side walls, a bottom portion and a back portion or backrest portion of the seat body.

According to a further embodiment of the present invention, the first layer and the second layer are mechanically attached to each other at their back portions. Generally, any mechanical connection is possible. Also, the connection can be releasably or non-releasably. Preferably the first layer comprises protrusions in the back portion protruding into mating openings formed in the second layer and fixedly mounted to the second layer using receiving elements fixed on the protrusions, preferably by means of a snap-fit connection. The receiving elements are preferably shoulder hole caps which also function as an attachment for shoulder straps or shoulder anchors so that additional protruding parts do not interfere with a back of a child. Accordingly, the shoulder hole caps have a double function in that they serve for a fixation of harness straps and in that they couple the second layer to the first layer by an engagement with the protrusions. Instead of the snap-fit connection, other means of connecting the shoulder hole cap to the outer seat shell would also be possible. For instance, a connection by means of screwing or bonding would also work. Harness belts and shoulder paddings can be coupled to the shoulder anchors.

Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present invention will hereinafter be described in conjunction with the following drawing figures, wherein like numerals denote like elements, and.

All figures are only schematic depictions of exemplary embodiments in which, in particular, distances and dimensional correlations are not presented to scale.

DESCRIPTION OF EMBODIMENTS

The following detailed description is merely exemplary in nature and is not intended to limit application and uses. Furthermore, there is no intention to be bound by any theory presented in the preceding background or summary or the following detailed description.

Figure 1:
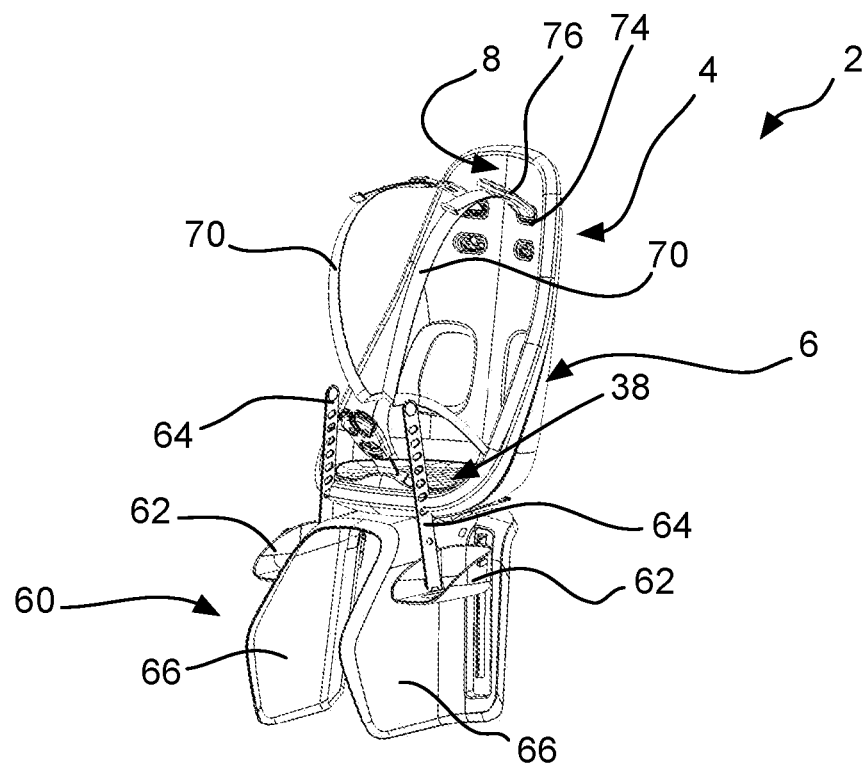
FIG. 1 shows a perspective front view of a child bike seat according to an embodiment of the present invention.
Figure 2:
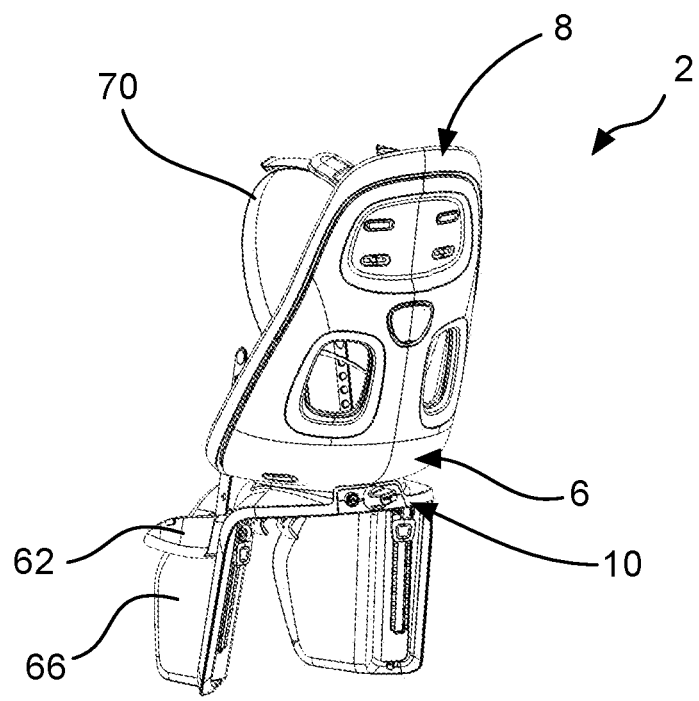
FIG. 2 shows a perspective rear view of the child bike seat of FIG. 1.
Figure 7:
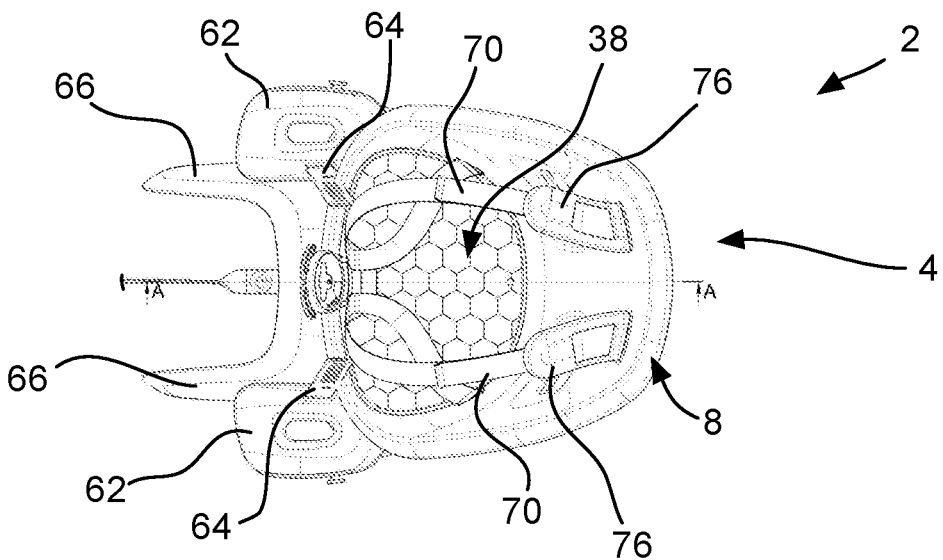
FIG. 7 shows a plan view of the child bike seat of FIG. 1.

In FIGS. 1 and 2, a child bike seat 2 according to an embodiment of the present invention is shown in perspective view. Furthermore, FIG. 7 shows a plan view of the child bike seat 2. The child bike seat 2 comprises a seat body 4 for accommodating a child therein, a footrest portion 60 for supporting the legs and feet of the child, as well as a fixation means 10 for fixing the child bike seat 2 to a bike.

Figure 3:
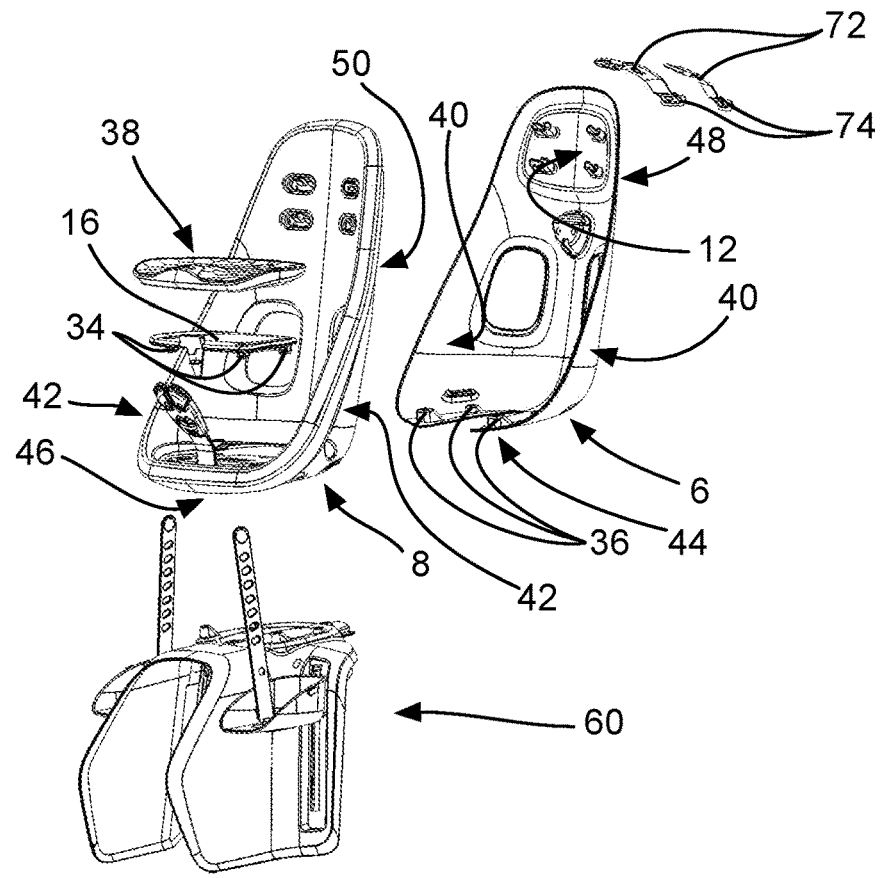
FIG. 3 shows a perspective partially exploded front view of the child bike seat of FIG. 1.

The seat body 4 comprises a multi-layer structure formed by a first layer 6 and a second layer 8 which are attached to each other. Furthermore, attached to the seat body 4 are harness belts 70. The upper ends of the harness belts 70 are passed through shoulder anchors 72 which are fixed to the seat body 4 by means of shoulder hole caps 74 as shown in FIG. 3, for instance. On the shoulder anchors 72, a shoulder padding 76 is arranged.

The first layer 6 is made from polypropylene (PP) and is provided as a supporting layer. Using PP adds stiffness to the overall seat structure. Instead of PP, polycarbonate, acrylonitrile butadiene styrene or polymethyl methacrylate could be used for the first layer 6.

Figure 17:
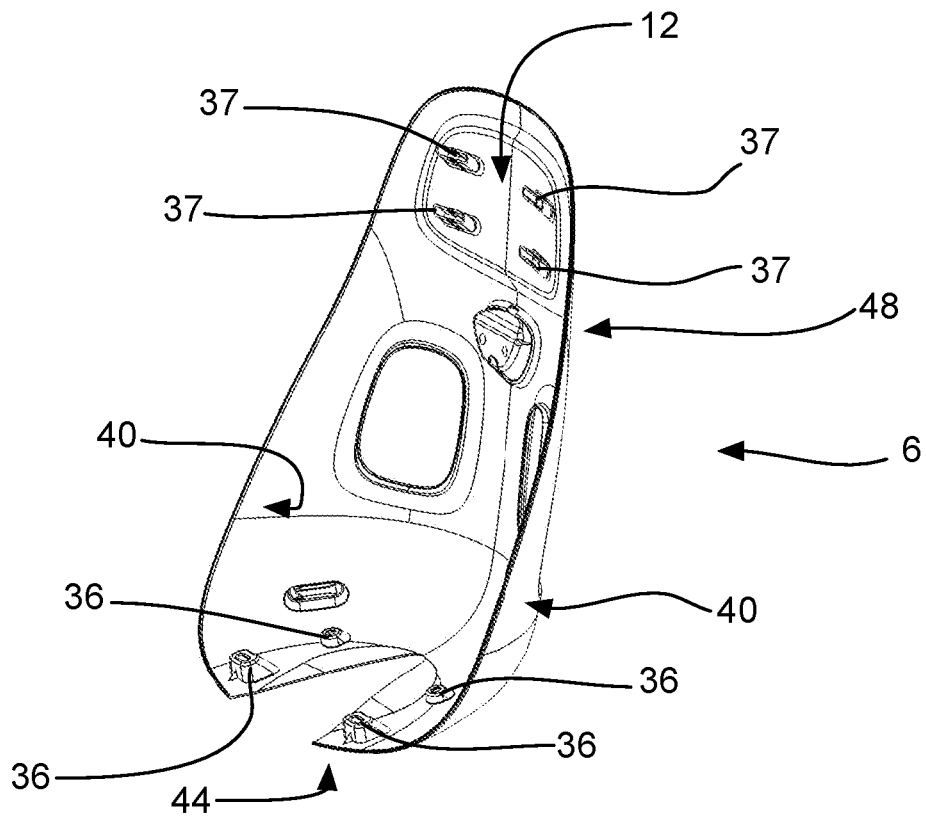
FIG. 17 shows a perspective view from above of an outer seat shell of the child bike seat of FIG. 1.
Figure 18:
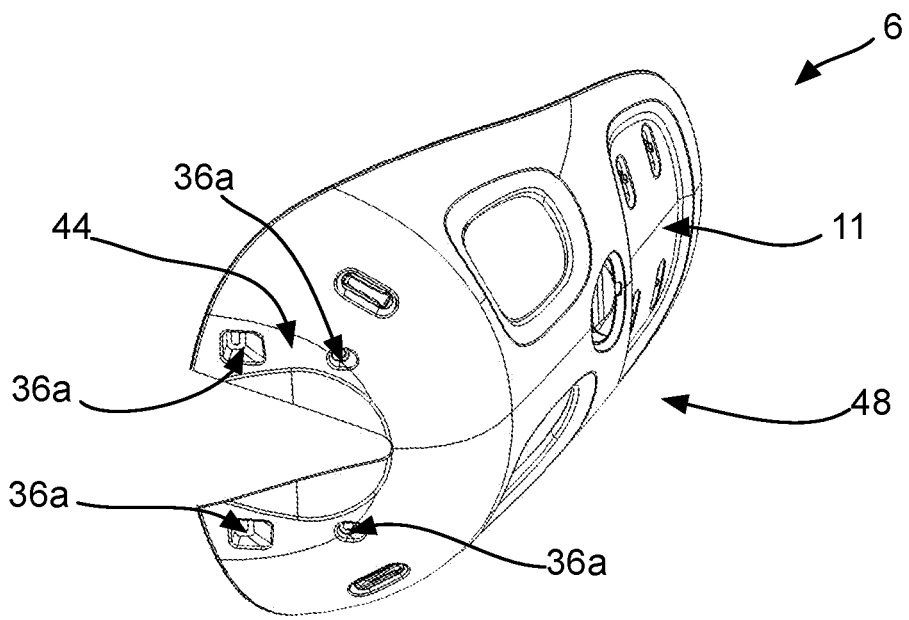
FIG. 18 shows a perspective view from below of an outer seat shell of the child bike seat of FIG. 1.
Figure 19:
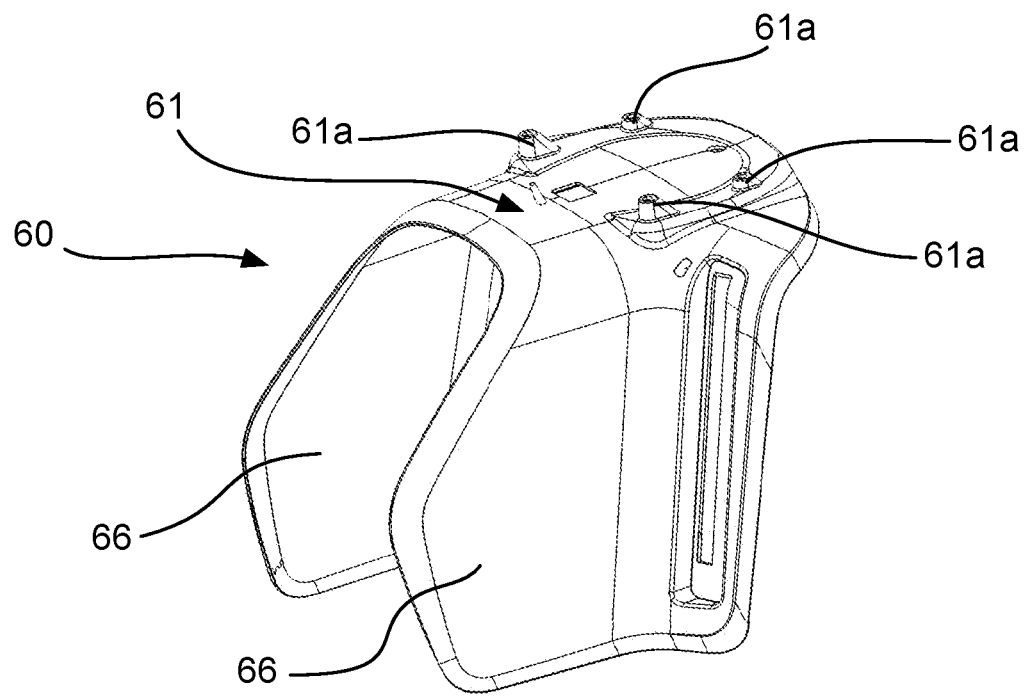
FIG. 19 shows a perspective view from above of a footrest portion of the child bike seat of FIG. 1.
Figure 20:
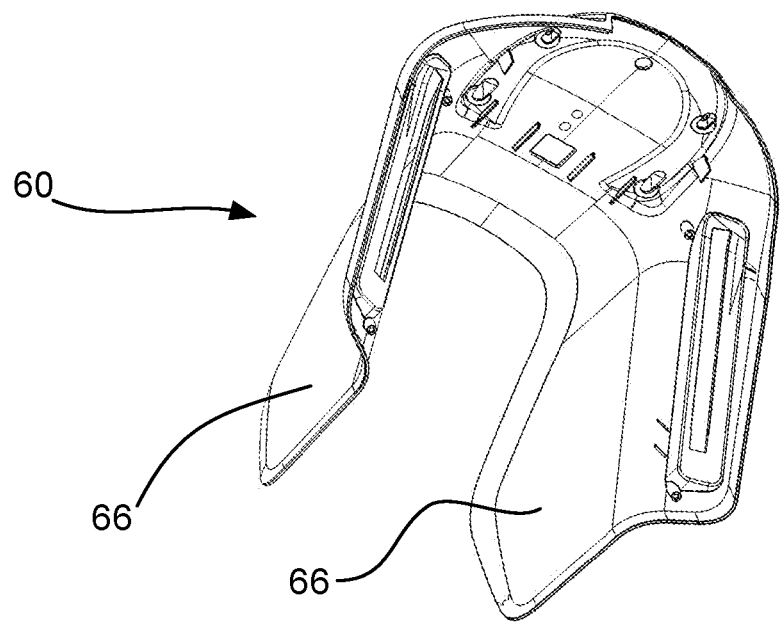
FIG. 20 shows a perspective view from below of a footrest portion of the child bike seat of FIG. 1.

The detailed construction of the first layer 6 will be described with reference to FIGS. 17 and 18 which show a front perspective view and a rear or bottom perspective view of the first layer 6, respectively.

The first layer 6 which is also referred to as outer seat shell comprises a bottom portion 44 and a back portion 48. In the bottom portion 44 of the first layer 6, protrusions 36 are provided facing in the upward direction. In other words, in a mounted condition, the protrusions 36 in the bottom portion 44 face away from the fixation means 10. On the opposite side of the protrusions 36, recesses 36a are provided. Furthermore, protrusions 37 are provided in the back portion 48. Both kinds of protrusions 36, 37 are arranged on a side of the first layer 6 facing the second layer 8 in a mounted condition of the seat body 4. Furthermore, the protrusions 37 are arranged in a protruded section 12 of the first layer 6. On the opposite side of the protruding section 12, a recessed section 11 is provided.

The second layer 8 is made from a foam material, i.e. a cell-like material, here expanded polypropylene (EPP), and is provided for at least partially accommodating the child. Like the first layer 6, the second layer 8 is integrally formed. During manufacturing the second layer 8, the cells melt together at the outer surface of EPP which creates a durable coating or skin which makes the second layer 8 wear resistant and protects the internal cell-like structure from disintegrating. The thickness and density of the second layer 8 are adjusted to provide sufficient rigidity and balance between hardness and weight. In the present embodiment, the density of the second layer 8 is about or exactly 80 gr./ltr. which can be considered an optimal balance between hardness and weight. Instead of the EPP material, a polyurethane foam could be used instead. Furthermore, an improved stronger EPP foam called "chock" could be used. Although not shown in the drawings, the second layer 8 can comprise an internal structure like a grid or space structure of polypropylene or acrylonitrile butadiene styrene.

Figure 15:
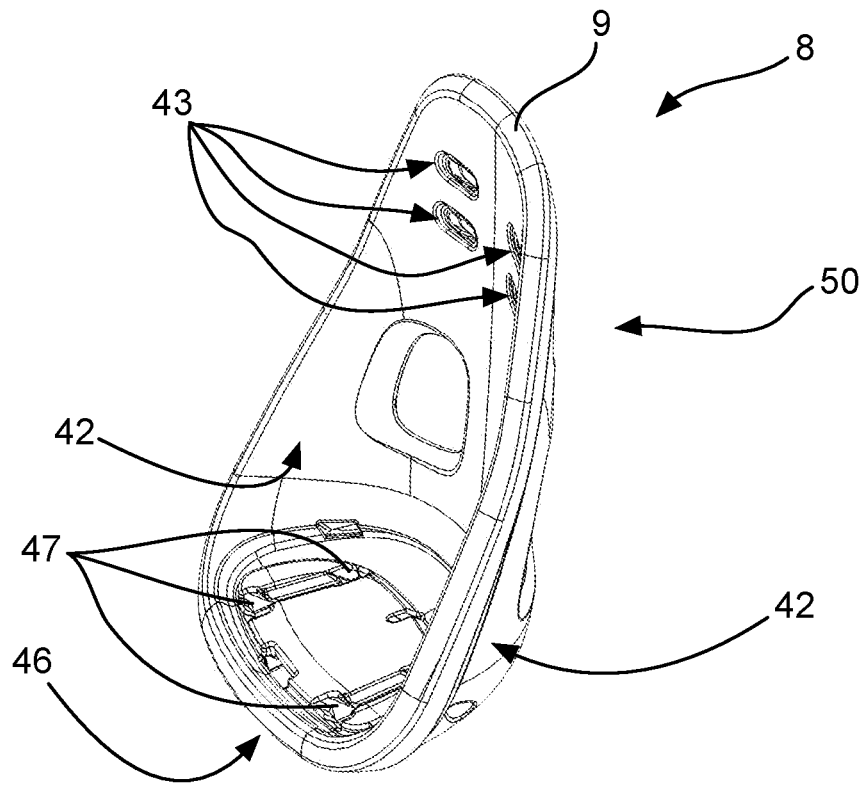
FIG. 15 shows a perspective view from above of an inner seat shell of the child bike seat of FIG. 1.
Figure 16:
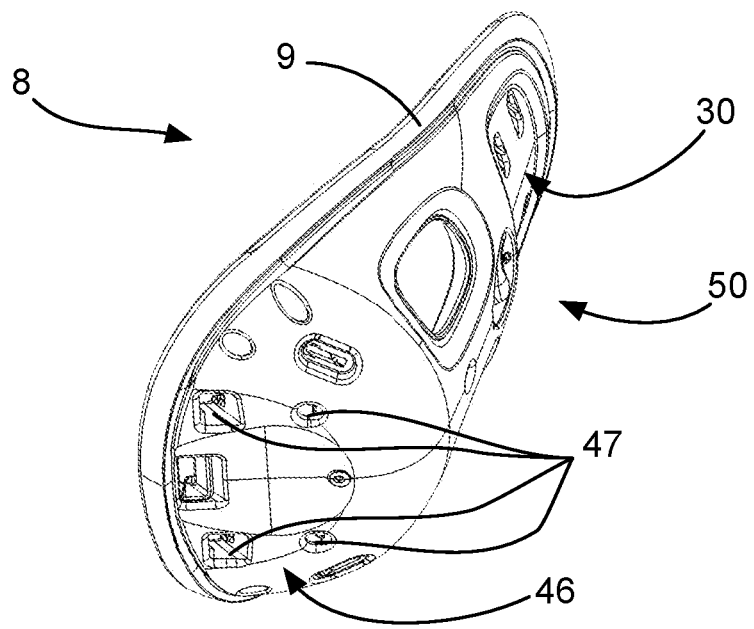
FIG. 16 shows a perspective view from below of an inner seat shell of the child bike seat of FIG. 1.

The detailed construction of the second layer 8 will be described with reference to FIGS. 15 and 16 which show a front perspective view and a rear or bottom perspective view of the second layer 8, respectively.

The second layer 8 comprises a back portion 50 and a bottom portion 46 as well as two side walls 42. In the back portion 50 of the second layer 8, a recessed section 30 is provided and in the area of the recessed section, openings 43 are provided for passing the shoulder straps or shoulder anchors therethrough. Furthermore, the openings 43 are formed matingly with the protrusions 37 of the first layer 6 in such a manner that the protrusions 37 can be inserted into the openings 43 such that they protrude into but not beyond them. The recessed section 30 is formed matingly with the protruding section 12 of the first layer 6. In the bottom portion 46 of the second layer 8, openings 47 are provided. The openings 47 are configured to receive the protrusions 36 of the first layer 6 from below and to receive protrusions 34 of a seatpad plate 16 which will be described later. The second layer 8 further comprises an edge portion 9 which is configured to surround edges of the first layer 6.

The footrest portion 60 which is shown in FIGS. 1, 2, 3, 4, 19 and 20, comprises two leg portions 66, two foot trays 62 and two foot straps 64 for fixing a child's feet on the foot trays 62. The footrest portion 60 and the seat body 4 are fixedly coupled together by means of the fixation means 10. More precisely, a bridging portion 61 connecting both leg portions 66 at the upper end is provided. The bridging portion 61 comprises protrusions 61a which are adapted to be accommodated in correspondingly formed recesses 36a in the bottom portion of the first layer 6.

Figure 4:
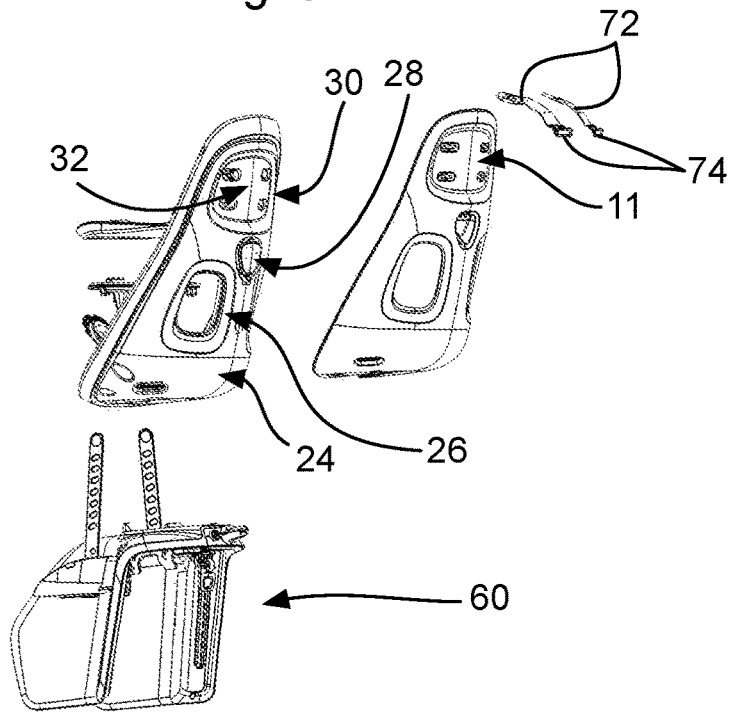
FIG. 4 shows a perspective partially exploded rear view of the child bike seat of FIG. 1.

FIGS. 3 and 4 show a partially exploded view of the seat body 4 as described above. As already mentioned before, the seat body 4 comprises a first layer 6 which may also be referred to as outer seat shell and a second layer 8 which may be referred to as inner seat shell. As is clearly shown, both seat shells 6, 8 are matingly formed such that the inner seat shell 8 may be accommodated in the outer seat shell 6. Each seat shell 6, 8 is integrally formed by injection molding and comprises the side walls 40, 42, the bottom portion 44, 46 and the back portion 48, 50 jointly forming side walls, a bottom portion and a back portion of the seat body 4.

As is further shown in FIG. 3, a fixation plate 16 which may also be referred to as seatpad plate and which serves as a pressure application means is arranged between a seatpad 38 and a bottom portion 46 of the second layer 8.

Figure 13:
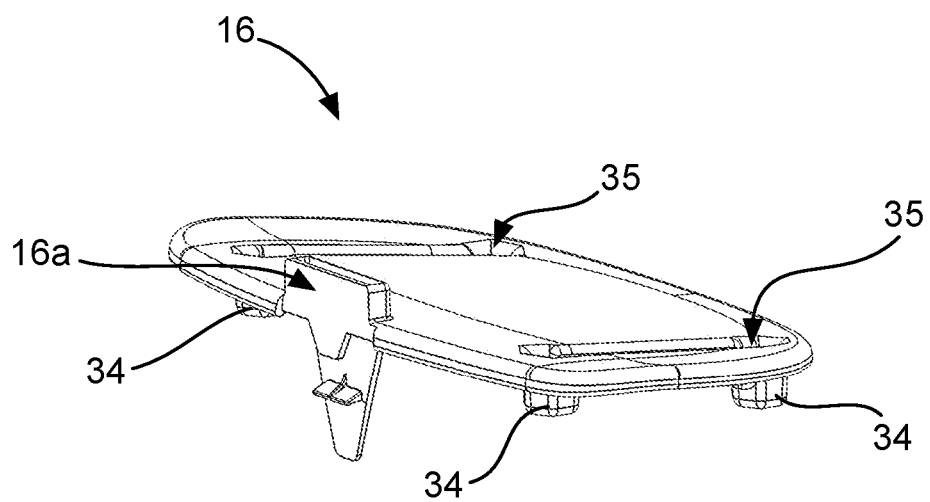
FIG. 13 shows a perspective view from above of a fixation plate of the child bike seat of FIG. 1.
Figure 14:
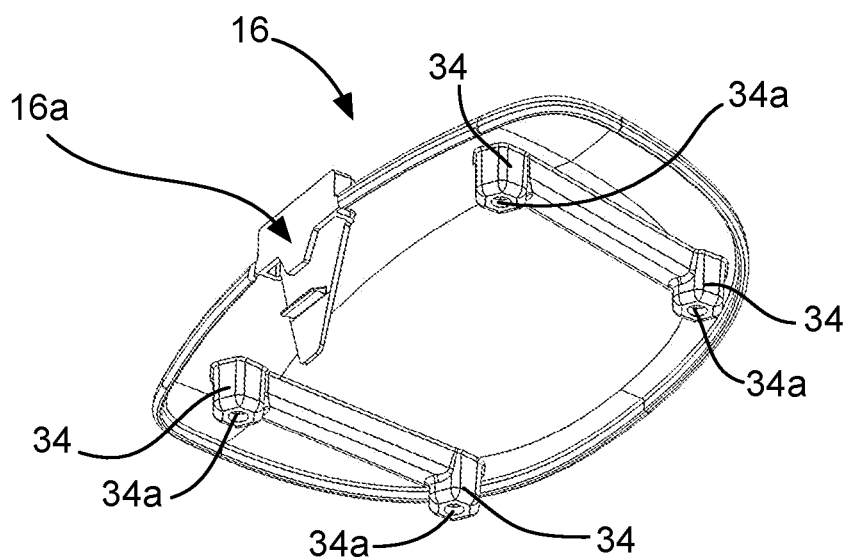
FIG. 14 shows a perspective view from below of a fixation plate of the child bike seat of FIG. 1.

The seatpad plate 16 is shown in FIGS. 13 and 14 in greater detail. The seatpad plate 16 comprises a center buckle strap fixation portion 16a which has an opening in its upper side so as to receive a center buckle strap. Furthermore, the seatpad plate 16 comprises four protrusions 34 protruding from a bottom side of the seatpad plate 16 as is shown in FIG. 14. At the positions where the protrusions are formed, recesses 35 are formed on the upper side of the seatpad plate 16 as is shown in FIG. 13. In the embodiment, the recesses 35 are formed so as to accommodate hexagonal nuts 17 non-rotatably therein (see FIG. 10). In the protrusions 34, openings 34a are provided such that a threaded bolt or a screw can be inserted into the protrusions 34 from below and be engaged with the nuts provided in the recesses 35.

Figure 11:
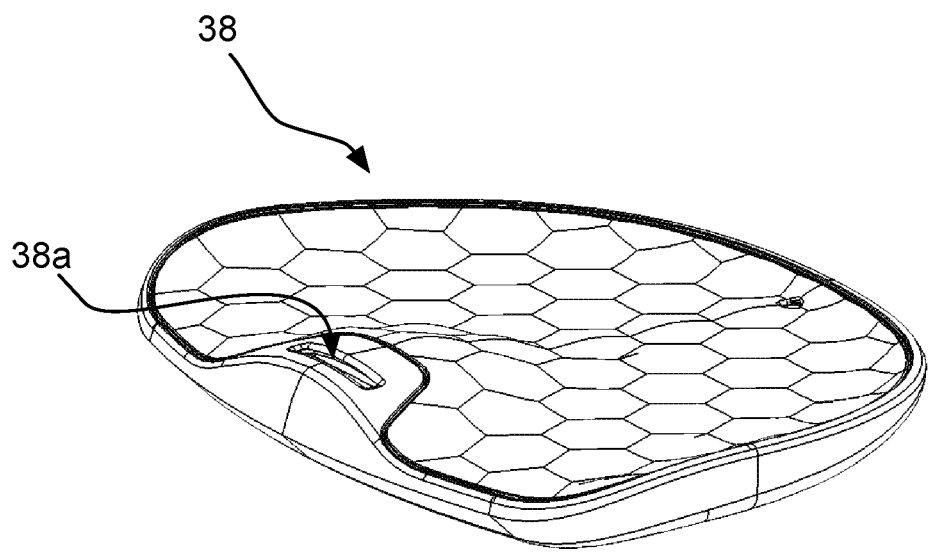
FIG. 11 shows a perspective view from above of a covering member of the child bike seat of FIG. 1.
Figure 12:
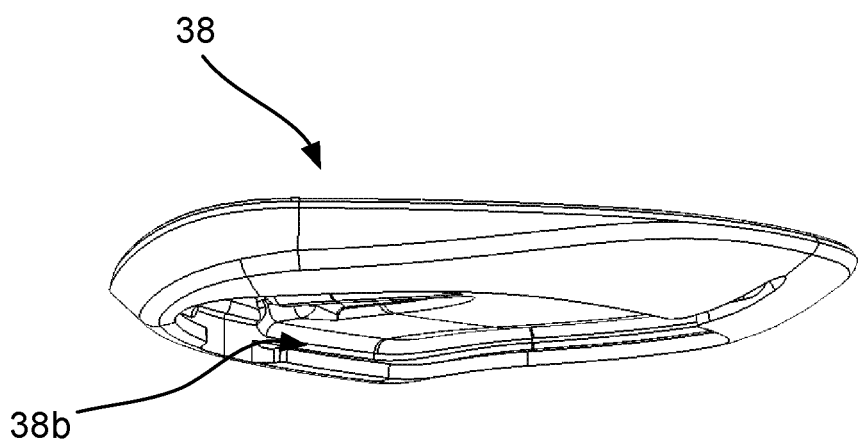
FIG. 12 shows a perspective view from below of a covering member of the child bike seat of FIG. 1.

The seatpad 38 is shown in detail in FIGS. 11 and 12. The seatpad 38 is made from a soft material which in the present embodiment is formed from ethylene-vinyl acetate and comprises a center buckle strap opening 38a in which a portion of the center buckle strap can be accommodated and which is provided on the upper side of the seatpad 38, i.e. on the side where the child is in contact with the seatpad 38. On the opposite or lower side of the seatpad 38, a recess is formed in which a groove 38b is formed. The recess and the groove are formed such that the seatpad 38 can be fixed on the seatpad plate 16 by putting an edge portion of the seatpad 38 over the seatpad plate 16 such that the groove 38b engages with a peripheral edge of the seatpad plate 16. In this way, the seatpad 38 can be securely provided on the seatpad plate 16.

Figure 5:
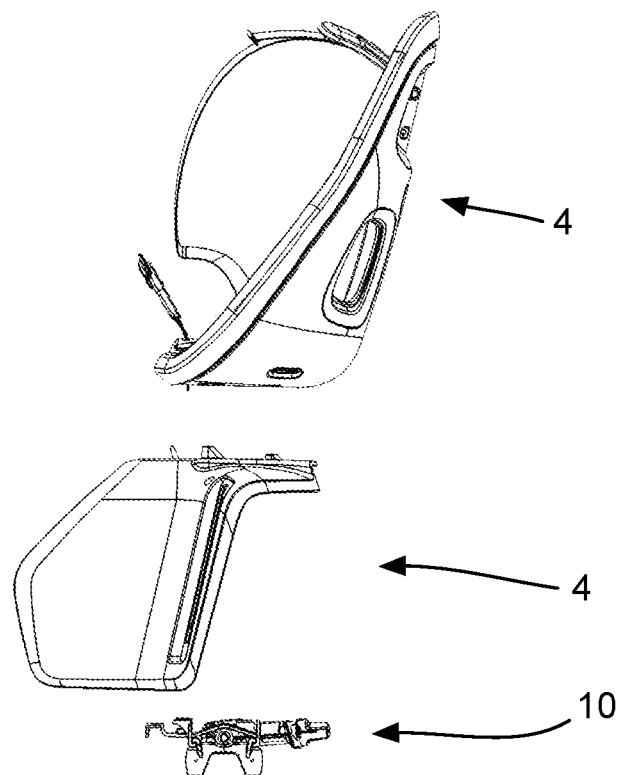
FIG. 5 shows a perspective partially exploded side view of the child bike seat of FIG. 1.
Figure 6:
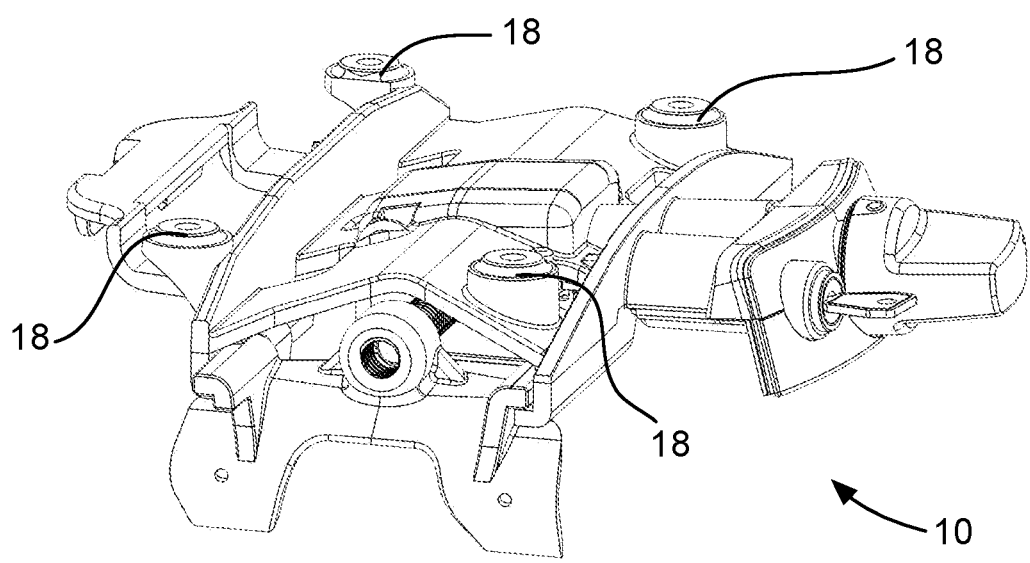
FIG. 6 shows a fixation means of the child bike seat of FIG. 1 in perspective view.

The main parts of the child bike seat 2, i.e. the seat body 4, the footrest portion 60 and the fixation means 10 are also shown in FIG. 5 in a side view from the left. FIG. 6 shows a perspective view of the fixation means 10 which is used to fix the seat body 4 and the footrest portion 60 to a bike. The fixation means 10 comprises supporting sections 18 which can be contacted with the bridging portion 61. In the present embodiment, the supporting section 10a comprise openings such that a threaded bolt or screw can be inserted from below and engage with the seatpad plate 16.

Figure 8:
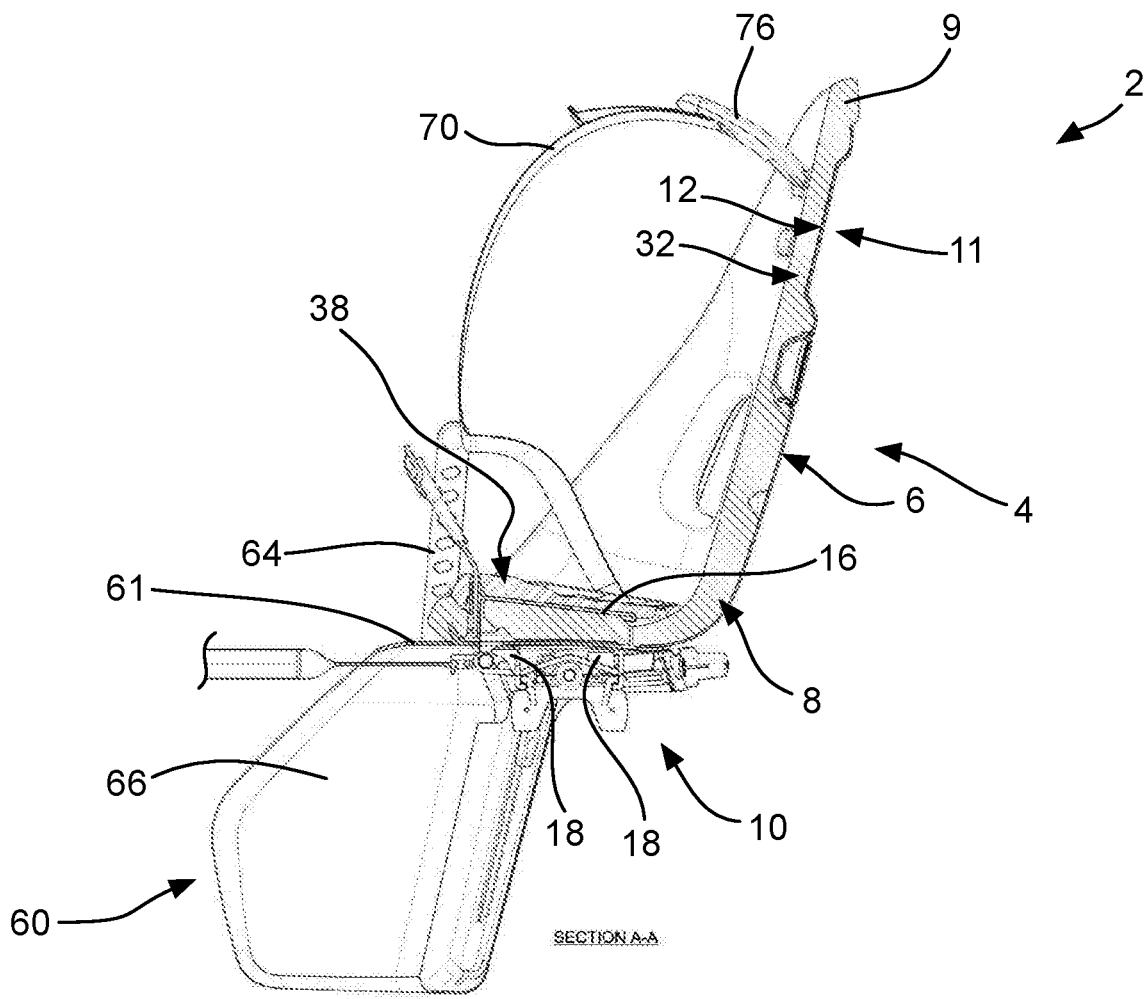
FIG. 8 shows a sectional view of the child bike seat of FIG. 1 in plane A-A of FIG. 7.
Figure 9:
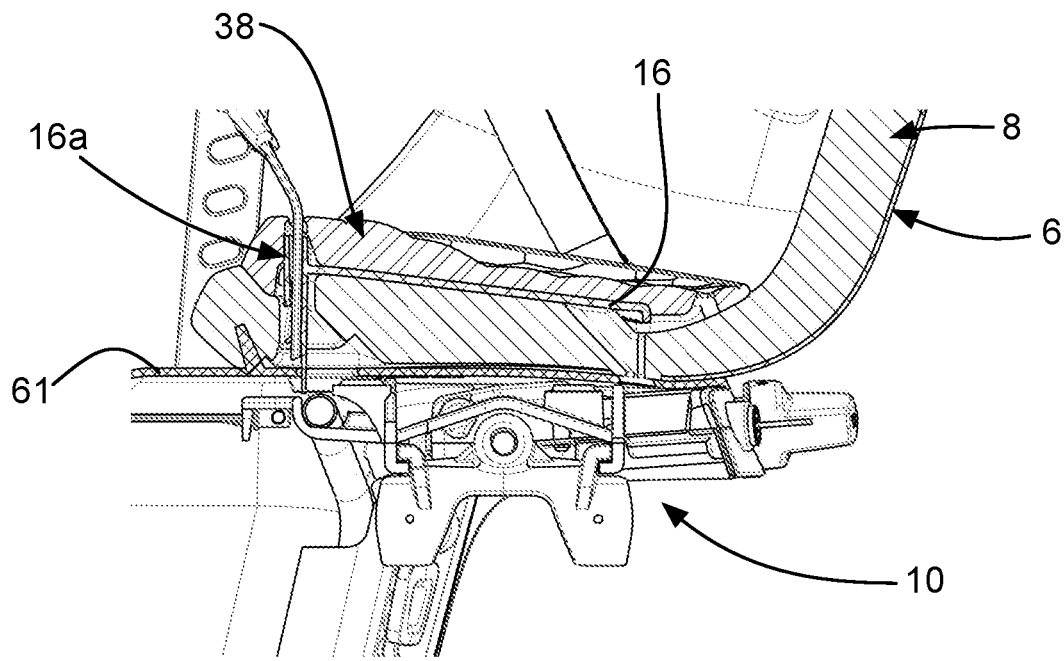
FIG. 9 shows an enlarged portion of the sectional view of FIG. 8.

FIG. 8 shows a sectional view of the child bike seat along plane A-A as shown in FIG. 7. FIG. 9 shows an enlarged portion of FIG. 8 and FIG. 10 shows a perspective sectional view of the bottom portion of the seat body 4 mounted to the fixation means 10.

As is shown in FIG. 8, the first layer 6 and the second layer 8 are coupled to each other such that the protruding section 12 of the first layer 6 protrudes into the recess 32 of the second layer 8 and is in contact with the same or at least arranged in close vicinity to the same. In this condition, the protrusions 37 are arranged in the openings 43. From a seating side of the second layer 8, shoulder hole caps 74 are snap-fittedly engaged with the protrusions 37 so that a mechanical connection between the first layer 6 and the second layer 8 is achieved by means of the protrusions interacting with the shoulder hole caps 74. In this way, the protruding section 12 of the first layer 6 is fixedly held in the recess 32 of the second layer 8. Since the protruding section 12 and the recess 32 are matingly formed, a movement between both layers is not possible or substantially prevented along the layers.

Figure 10:
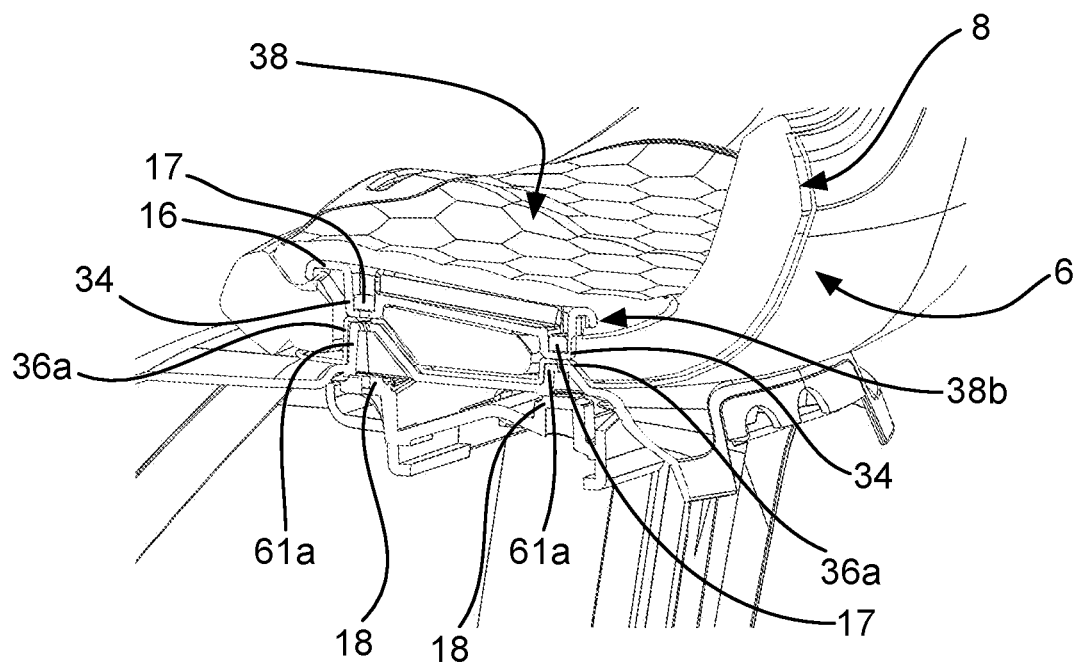
FIG. 10 shows an enlarged sectional view of the child bike seat of FIG. 1 in a plane parallel to the plane A-A of FIG. 8.

As is shown in FIGS. 8, 9 and 10, the first layer 6, the second layer 8, the bridging portion 61 are fixed on the fixation means 10 using the seatpad plate 16. In other words, a portion of the second layer 8 and a portion of the first layer 6 are sandwiched between the seatpad plate 16 and the fixation means 10. In FIG. 10, it can be seen that the supporting portions 18 rest against the bridging portion 61 in the area of the protrusions 61a. The protrusions 61a are accommodated in recesses 36a of the first layer 6. The protrusions 36 of the first layer 6 received in the openings 47 formed in the second layer 8. The protrusions 34 of the seatpad plate 16 protrude into the openings 47 from above and such that they are in close proximity to the protrusions 36. In order to fix all elements together, screws can be passed from below such that they extend through the supporting portions 18, the protrusions 61, 36 and 34 and engage with a nut 17. By tensioning the screw, the seatpad plate 16 exerts a pressing force on the second layer 8 fixing the second layer 8 and the first layer 6 to the fixation means 10.

In conclusion, it is pointed out that terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A bicycle child seat, comprising:
a seat body configured to accommodate a child therein, the seat body comprising a multi-layer structure with at least a first layer and a second layer made from different materials;
a fixation member configured to couple the bicycle child seat to a bicycle; and
a pressing member coupled to the second layer and configured to exert a pressing force towards the fixation member onto the second layer,
wherein the first layer is configured to at least partially cover the second layer and to at least partially support the second layer,
wherein the first layer comprises a first mating component and the second layer comprises a second mating component, and
wherein the first and second mating components mechanically mate to secure the first and second layers to each other by a mechanical connection.

2. The bicycle child seat according to claim 1, wherein the first layer is adapted to at least partially support the second layer on the fixation member such that a movement of the first layer relative along the second layer is substantially prevented.

3. The bicycle child seat according to claim 1, wherein the mechanical connection comprises a positive-fit connection such that the first and second layers are immovable with respect to each other in at least one direction.

4. The bicycle child seat according to claim 1, wherein the second layer comprises a uniform main surface facing the first layer and non-uniform surface areas, wherein the first layer is attached to the uniform main surface and the non-uniform surface areas.

5. The bicycle child seat according to claim 1, wherein the second mating component comprises a recess and the first mating component comprises a protruding section.

6. The bicycle child seat according to claim 1, wherein the pressing member comprises protrusions protruding from a bottom side of a fixation plate towards the fixation member, and wherein the first layer comprises projections protruding from the first layer in a direction facing away from the fixation member, wherein the second layer comprises recesses into which one of the protrusions and one of the projections respectively extend from opposite sides such that their end portions face each other, and wherein the protrusions and projections comprise openings configured to accommodate a fixation device configured to fix the pressing member to the fixation member.

7. The bicycle child seat according to claim 6, further comprising a covering member configured to cover the pressing member, the covering member being configured as a seating element of the bicycle child seat and comprising a soft material.

8. The bicycle child seat according to claim 7, wherein the covering member comprises ethylene vinyl acetate.

9. The bicycle child seat according to claim 1, wherein the Young's modulus of the second layer is smaller than the Young's modulus of the first layer, wherein the second layer is formed from a foam material and wherein the second layer is solid.

10. The bicycle child seat according to claim 1, wherein the first layer is formed from a thermoplastic material, and wherein the second layer is formed by expanded polypropylene, wherein the second layer comprises an internal reinforcement structure or an expanded polypropylene mixture containing a strengthening component.

11. The bicycle child seat according to claim 10, wherein the expanded polypropylene comprises a density ranging from 40 to 120 gr./ltr.

12. The bicycle child seat according to claim 10, wherein the expanded polypropylene comprises a density ranging from 50 to 100 gr./ltr.

13. The bicycle child seat according to claim 10, wherein the expanded polypropylene comprises a density ranging from 60 to 80 gr./ltr.

14. The bicycle child seat according to claim 1, wherein the first layer comprises a thickness of 1.6 to 2.9 mm, and the second layer comprises a thickness of 8 to 31 mm.

15. The bicycle child seat according to claim 14, wherein the first layer comprises a thickness of 1.8 mm and the second layer comprises a thickness of 17 to 31 mm.

16. The bicycle child seat according to claim 1, wherein the first layer is structured as an outer seat shell and the second layer is structured as an inner seat shell accommodated in and provided adjacent the outer seat shell.

17. The bicycle child seat according to claim 1, wherein the first layer and the second layer are mechanically attached to each other at their back portions, wherein the first layer comprises protrusions in the back portion protruding into mating openings formed in the second layer and is fixedly mounted to the second layer using receiving elements fixed on the protrusions by a snap-fit connection, wherein the receiving elements are shoulder hole caps configured to attach to shoulder straps.

18. The bicycle child seat according to claim 1, wherein the mechanical connection is releasable.

19. A child seat for a bicycle, comprising:
a seat body configured to accommodate a child therein, the seat body comprising a first layer having a first mating component disposed at a first back portion of the first layer and a second layer having a second mating component disposed at a second back portion of the second layer,
wherein the first and second mating components mechanically mate to secure the first and second layers to each other at the first and second back portions by a snap-fit connection;
wherein the first layer comprises protrusions in the first back portion protruding into mating openings formed in the second layer and is fixedly mounted to the second layer using receiving elements fixed on the protrusions by the snap-fit connection, wherein the receiving elements are shoulder hole caps configured to attach to shoulder straps; and
a fixation member configured to couple the child seat to a bicycle.

20. The child seat according to claim 19, wherein the snap-fit connection is releasable.

21. The child seat according to claim 19, wherein the first mating component comprises a protrusion and the second mating component comprises a recess.

* * * * *